United States Patent Office 3,293,051
Patented Dec. 20, 1966

3,293,051
HIGH TITANATE GLASS BEADS
Charles Edwin Searight, Ezra McLaurin Alexander, and John Robert Ryan, all of Jackson, Miss., assignors to Cataphote Corporation, Jackson, Miss., a corporation of Ohio
No Drawing. Filed Aug. 22, 1963, Ser. No. 303,925
8 Claims. (Cl. 106—47)

The present invention relates to glass compositions, and particularly glasses for use as retro-reflective lens elements to illuminate objects at night.

Traffic signs are usually reflectorized with high index glass beads. Glass beads act as optical lens elements to focus light coming from a distant source at a point close to the back surface of the bead or sphere. In a retro reflective system, the light is focused by the bead at a point at its back surface, i.e., that portion of the bead which is the most distant from the light source, where the light beam is concentrated on the face of a reflector, such as tin foil, from which it is reflected or returned through the beads in a direction essentially parallel to that of the incoming light. A retro-reflective system of this type will operate efficiently if the light is focused at, or close to, the back surface of the spherical beads, and if the medium behind the beads has a high reflecting power for the focused light.

The geometrical optics of the spherical lens gives the following formula for the focal distance of the axial rays:

$$f = r\frac{2-N}{2N-2} \quad (1)$$

Here $f$ denotes the distance of the focus from the back surface of the sphere, $r$ the radius of the sphere, and $N=n/n_0$, the effective refractive index. The effective index $N$ is the ratio of the refractive index $n$ of the material of which the beads are made to that of the surrounding medium.

For rays passing farther away from the axis, the focal distance is shorter than that given by Formula 1. Thus, there is no single figure that can be given as a focal distance of a sphere. However, for practical purposes, it is important to know at what value of the effective index N the major part of the light flux is focused near to the back surface of the sphere. It takes an effective index of 2 to focus the axial rays at the back surface, while it is enough to have $N=1.8$ to reach the same condition in the 45° rays and only $N=1.4$ with the peripheral rays. With $N=2$, all of the rays, with the exception of the narrow pencil of the axial rays, are focused inside of the sphere, and the concentrated light flux is spread over a small circular area at the back surface. With $N=1.4$, the situation is reversed; all of the rays are focused behind the sphere, with the exception of the peripheral rays. The net result, however, is roughly the same as in the first case with the strongly illuminated area being about the same size at the back surface of the sphere in each case. The intermediate case with $N=1.8$ appears to give better focusing than the either of the two extremes. Actually, it is more important to have a close focal distance for the light flux between the axial and the 45° rays than for the peripheral flux, because of the great loss by reflection at high angles of incidence. Consequently, an effective index between 1.8 and 2.0 is the optimum value.

When the glass beads are used in such a way that they are in contact with the light-reflecting layer at their back surface only, their front surface is exposed to the air ($n_0=1$). The refraction at the front surface is determined only by the actual refractive index $n$ of the glass. As long as all rays are focused internally or at the back surface, the refractive index of the medium behind the beads need not be considered.

When the beads are covered over their front surfaces with a medium of a refractive index $n_0$, the index of glass is reduced to the value $N=n/n_0$. Most of the organic binders and transparent plastic materials have an index of refraction near 1.5. Beads made of glass with an index $n=1.9$ embedded in such a medium will have an effective index of only 1.27. Very poor focusing for the axial and the 45° rays will reuslt. On the other hand if an effective index of $N=1.8$ is desired, the glass should have an actual index of $n=1.8\times1.5=2.7$. The most effective solution to the problem is the use of glass beads with ultra-high indices of refraction (viz. about 2.4 and up). The refractive index 2.9 should be considered the upper limit obtained by glasses of our invention.

There are provided, according to this invention, novel transparent glasses characterized by having good outdoor weatherability properties and ultra high indices of refraction with respect to the D-line of sodium, and which are suitable for use in the manufacture of glass beads or spheres for use in signs and the like for reflectorization or illumination.

The glasses provided herewith contain high amounts of titanium dioxide i.e., 55 to 75% by weight. The use of large amounts of titanium dioxide is desirable because it is economical and has a very high index of refraction. Also, titanium dioxide is colorless in glass compositions which do not contain certain of the oxides of the transition elements. In addition, it has a density of 4.26 grams per cubic centimeter, which is considerably lower than many other of the ingredients of our glasses. Because of the low density, ultra high index of refraction, availability, low cost, and high clarity, there has been included a maximum, or near maximum, content of titanium dioxide in the glass compositions.

The composition of the glasses provided by this invention essentially consist of a composition of the following table wherein the quantities are in percent by weight:

| | |
|---|---|
| $TiO_2$ | 55–75 |
| BaO group | Not above 45 |
| ZnO | 0–35 |
| CdO | 0–35 |
| $Bi_2O_3$ | 0–35 |
| PbO | 0–35 |
| Strong glass former group | Not above 8 | wherein the BaO group consists of BaO, CaO, SrO and MgO and the total amount of these oxides in the glass is at least 10% by weight, and the strong glass former group consists of $SiO_2$, $Al_2O_3$, $B_2O_3$, $GeO_2$, and $P_2O_5$ and the total amount of these oxides in the glass is at least 0.2% by weight.

In the form of small beads these glasses almost all have refractive indices of at least 2.1.

Immediately following is a comparison of the indices of refraction and densities of constituents that can be used in our glass compositions.

| Component | Index of Refraction | Density, gm./cc. |
|---|---|---|
| $TiO_2$ | 2.9 | 4.26 |
| PbO | 2.51–2.71 | 8.0–9.53 |
| CdO | 2.49 | 6.95–8.15 |
| ZnO | 2.0–2.1 | 5.6 |
| CaO | 1.84 | 3.35 |
| BaO | 1.98 | 5.72 |
| $Bi_2O_3$ | 1.91 | 8.2–8.9 |
| SrO | 1.87 | 4.7 |
| MgO | 1.74 | 3.58 |

As can be seen, titanium dioxide has a very high index of refraction and a relatively low density. This is important to the consumer since, for a particular size range of glass beads utilized, the lower the density of the glass, the greater will be the coverage area achieved.

Titanium dioxide has not been utilized in such large quantity for the manufacture of small articles such as glass beads or spheres because it has a strong tendency to devitrify, even in small quantity.

In the prior art, very high index of refraction glasses have been attained by the use of large quantities of bismuth oxide in combination with lead, and various variations of this, but these glasses have extremely high densities. One pound of our glass beads, because we have at least about 55% by weight of titanium dioxide present, would easily cover 25% more area than these heavier glasses. In some instances, glass beads of this invention could cover nearly half as much area than some of the glass compositions of the prior art.

Bismuth oxide and lead oxide are optionally present in our glass compositions. Both of these materials usually impart a yellow color to the glass compositions. When certain oxides, such as cadmium oxide, also are used, the color is diminished appreciably. Other oxides in the presence of bismuth and lead also tend to lighten the color. But when bismuth and lead are totally absent from our glass compositions, and the glass is produced under oxidizing conditions, these glasses are colorless and of high clarity and have high transmissibility to light. However, bismuth oxide and lead oxide do contribute significantly to the index of refraction, but not at the expense of titanium dioxide. Additionally bismuth oxide and lead oxide are very good flux materials for many of these glass compositions. Due to the high titanium dioxide content, bismuth oxide and lead oxide give acceptable glasses of light color. Although the light transmission of the colored glass beads made utilizing high bismuth oxide and lead oxide content is reduced, the glass beads are still very highly efficient as retro-reflectors.

Zinc oxide and cadmium oxide also contribute significantly to the index of refraction of these glass compositions. Zinc oxide has a high index of refraction and a relatively low density and cadmium oxide has a high refractive index and a higher density.

Barium oxide and its group consisting of calcium oxide, strontium oxide, and magnesium oxide, are highly compatible with titanium dioxide, differing only in degree of compatibility. Magnesium oxide is perhaps the least compatible of this group. The barium oxide group contributes to the high index of refraction of the glass composition and also acts as a flux to further assist in making the glass homogeneous.

The so-called "strong glass formers," which consist of $SiO_2$, $Al_2O_3$, $B_2O_3$, $GeO_2$ and $P_2O_5$, are present in our glass compositions in at least 0.2% by weight. They tend to make the glass more vitreous. With the possible exception of germanium dioxide, all of these so-called "strong glass formers" detract from the index of refraction of the glass compositions and therefore are advisably held to a minimum. This is sometimes very difficult to achieve inasmuch as refractory materials used in the furnace for producing such glass compositions invariably impart some of their oxides to the glass composition as impurities. Silicon dioxide, aluminum oxide and magnesium oxide are typical materials which enter the glass from the refractory. Minor amounts of certain oxides used to flux the refractory when cast or otherwise formed into refractory blocks are also dissolved to some extent in the glass. Zirconium dioxide is also present in some of these refractory blocks. Therefore, as in all glass melting of a commercial nature, certain oxides of the refractory materials used for melting these glass compositions are imparted to the glass during the melting and fining stage and therefore might be found in the finished product.

During the interval of time that the various oxides are present in the porcelain crucible, or in the furnace, while being melted or brought to a molten stage, varying amounts of the oxides of which the crucible, or the furnace refractory, is made are brought into solution in the molten glass and contaminate or become a part of the glass being formed. For example, Table I(a) lists one of the compositions that we melted in a Coors porcelain crucible in terms of the charge formulation and Table I(b) indicates the actual composition as analyzed.

Table I(a):                                    Percent by weight
  $TiO_2$ ------------------------------------------ 70
  $CaO$ ------------------------------------------- 15
  $BaO$ ------------------------------------------- 10
  $Bi_2O_3$ ----------------------------------------- 5
Table I(b):
  $TiO_2$ ----------------------------------------- 67.2
  $CaO$ ------------------------------------------- 9.6
  $BaO$ ------------------------------------------ 14.4
  $Bi_2O_3$ ---------------------------------------- 4.8
  $SiO_2$ ------------------------------------------ 2.3
  $Al_2O_3$ ---------------------------------------- 1.4
  Other ------------------------------------------- 0.3

From the above, it is readily seen that the contamination from the Coors porcelain crucible is principally $SiO_2$ and $Al_2O_3$.

As mentioned previously, it was ascertained that in many cases the presence of some of the material being fluxed from the crucible walls, or when platinum crucibles were used, some of the strong glass forming oxides herein described actually enhanced the vitreous character of the glass. In fact, when using ultra pure oxides in melting some of the glasses in platinum crucibles in the absence of the "strong glass formers," there seems to be less tendency for glass formation. Utilizing random glass compositions in each system, we have ascertained that at least a trace amount of certain oxides are preferably present in our glasses and, in fact, are often necessary for glass formation. Additionally, we melted random glass compositions of the invention utilizing each of the strong glass formers herein described and also combinations thereof and found that, in the small quantities used, it was very difficult to distinguish between those strong glass formers which are best and those which are poorer in glass forming tendency.

As far as glass forming tendency is concerned, it does not appear to make much difference which oxides of this group are used. Except for the extremely high cost of germanium dioxide, it would be a preferred component of this group inasmuch as it does not appreciably detract from the high index of refraction characteristic of these glasses whereas all the other oxides of this group do detract from the index of refraction of these glass compositions. Therefore, we prefer to maintain the amounts of the strong glass formers present at not more than 5% by weight although in many instances it is not possible to do so.

The oxides of the strong glass formers herein described appear to serve a purpose other than actual glass formation. Solid state studies reveal that trace quantities of the so-called strong glass forming oxides, and we have included aluminum oxide in this group, in these glass compositions, actually serve two purposes. First, those oxides that possess high charge and relatively small ionic radii act in such a way as to polarize the highly polarizable ions, and thus deform the system sufficiently to provide for glass formation. These trace ions can be thought of as causing a disruption of the long range order necessary for crystallization, which results in long range disorder and glass formation. Second, nucleation, which usually results in the devitrification of glass, occurs in systems, in this case would-be glass, where the ionic configuration of the constituents is such that lattice vacancies occur within the systems, such as a "hole" where a cation or anion normally would be located in the vitreous state. The use of a small quantity of these so-called strong glass forming oxides, or aluminum oxide, probably fill in these "holes" or lattice vacancies and by doing so inhibit crystallization or devitrification and thereby contribute to glass formation.

Many of the glass compositions of this invention which are glassy in bead sizes pass through a U.S. Standard Sieve, 30 mesh, and are all glassy minus 100 mesh.

The glass compositions of the invention can be produced by utilizing the carbonates and, optionally, the peroxides of the BaO-group, cadmium oxide, and lead oxide. The zinc oxide, titanium dioxide and bismuth oxide are used as the oxide. For the most part, the oxide seems to be the best method of introducing bismuth oxide although bismuth nitrate is, in many instances, satisfactory. Silica can be added as sand, alumina as the oxide, $B_2O_3$ as boric acid, germanium dioxide as the oxide or carbonate and $P_2O_5$ as the anhydrous oxide. Additionally, various well known minerals may be used in parts or in total some of the glass compositions for many of the oxides used. Such minerals should be of reasonably high purity, however, since certain transition element oxides contribute deep color to these high titanium dioxide glasses. An example of such a contaminate is found in silicon dioxide and calcium carbonate from certain areas of the country wherein they are found with iron and cerium oxide present. We prefer that iron oxide and ceria be excluded from these glass compositions.

Example 1

Glass compositions of the present invention were made from approximately 25 grams of raw material fused and melted in Coors porcelain crucibles. The crucible containing the raw material constituting the compositions falling within the scope of the invention were placed in a gas fired furnace at about 2450° F. whereupon the glass was formed in from two minutes to about five minutes time, after which the crucible was removed and the glass was poured in the molten state onto a stainless steel plate whereupon it spattered into sheets and a range of particles was formed prior to cooling.

In the development of these high titanium dioxide containing glasses, we found that by atomizing the molten glass into glass beads, while suspended in air, we were able to achieve a vitreous character in larger sizes as compared to the splattering of the molten glass on a stainless steel plate as when a laboratory furnace is used.

Example 2

68 pounds of titanium dioxide, 17.9 pounds of calcium carbonate, or lime, 19.8 pounds of barium carbonate, 5 pounds of bismuth trioxide, 2 pounds of silicon dioxide, and 0.5 pound of boric acid are blended together and added continuously to a glass furnace wherein it is brought to a molten, fluid state and fined.

The batch charge composition is as follows:

| | Percent by weight |
|---|---|
| $TiO_2$ | 67.5 |
| CaO | 10 |
| BaO | 15.2 |
| $Bi_2O_3$ | 5.0 |
| $SiO_2$ | 2.0 |
| $B_2O_3$ | 0.3 |

After the fining of the molten glass is completed, the fluid glass is withdrawn from the furnace and atomized into various sizes.

The glasses are screened in such a way that the glass beads passing through a U.S. Standard 80 mesh sieve are utilized for various reflective purposes, such as signs, sheeting, et cetera. As a rule, that portion of the glass produced which does not pass through a U.S. Standard 80 mesh sieve is resmelted and reformed into glass beads or spheres which are minus 80 mesh.

Example 3

The following tables illustrate additional representative glass compositions of the invention which have been prepared:

TABLE 2
[Percentage Composition By Weight]

| | 1 | 2 | 3 | 4 | 5 | 6 | 7 | 8 | 9 | 10 | 11 |
|---|---|---|---|---|---|---|---|---|---|---|---|
| $TiO_2$ | 55 | 55 | 55 | 55 | 55 | 55 | 55 | 55 | 60 | 60 | 60 |
| CaO | 10 | 15 | 10 | 5 | 10 | 5 | 5 | 5 | 10 | 10 | 10 |
| BaO | 15 | 9.6 | 14.5 | 14 | 8 | 36 | 10 | 10 | 10 | 14.6 | 30 |
| PbO | 10 | | | 25 | 23 | | 29.6 | | 19.6 | 10 | |
| $Bi_2O_3$ | 2 | 20 | 20 | | 2 | | | 30 | | 5 | |
| $SiO_2$ | 5.0 | 0.2 | | 1 | 2 | 2 | 0.2 | | 0.4 | | |
| $Al_2O_3$ | 2.1 | 0.2 | 0.5 | | | 2 | | | | 0.4 | |
| $B_2O_3$ | 1.0 | | | | | | 0.2 | | | | |

TABLE 3
[Percentage Composition by Weight]

| | 12 | 13 | 14 | 15 | 16 | 17 | 18 | 19 | 20 |
|---|---|---|---|---|---|---|---|---|---|
| $TiO_2$ | 55 | 55 | 55 | 55 | 60 | 60 | 65 | 70 | 75 |
| CaO | 5 | 10 | 10 | 10 | 5 | 5 | 10 | 10 | 10 |
| BaO | 25 | 5 | 10 | 10 | 25 | 20 | 15 | 15 | 10 |
| SrO | 9.0 | | | | | | | | |
| PbO | | 29 | 24 | 5 | | 10 | 5 | | |
| ZnO | | | | | | 10 | | | |
| CdO | | | | 15 | | | | | |
| $Bi_2O_3$ | 5 | | | 5 | 5 | | 5 | 5 | 5 |
| $B_2O_3$ | 1.0 | | | | | | | | |
| $GeO_2$ | | 1.0 | | | | | | | |
| $P_2O_5$ | | | 1.0 | | | | | | |

TABLE 4
[Percentage Composition By Weight]

| | 21 | 22 | 23 | 24 | 25 | 26 | 27 | 28 | 29 | 30 | 31 |
|---|---|---|---|---|---|---|---|---|---|---|---|
| $TiO_2$ | 55 | 55 | 55 | 55 | 55 | 55 | 55 | 55 | 55 | 55 | 55 |
| CaO | 10 | 10 | 10 | | 55 | 44.6 | | | 10 | | 5 |
| BaO | 34.6 | 29.6 | 24.6 | 44.6 | | | | | | 10 | 5 |
| SrO | | | | 10 | | | 44.6 | | 10 | | |
| MgO | | | | | | | | 44.6 | | | |
| PbO | | | | | | | | | 20 | 34 | |
| ZnO | | | | | | | | | 10 | | |
| CdO | | | | | | | | | 24 | | |
| $Bi_2O_3$ | | | | | | | | | 14 | | 34.5 |
| $SiO_2$ | 0.2 | 0.2 | 0.2 | 0.4 | 0.3 | 0.2 | | 0.5 | 0.5 | 0.5 | 0.5 |
| $Al_2O_3$ | 0.2 | | 0.1 | | 0.1 | | | 0.5 | | 0.5 | |
| $B_2O_3$ | | 0.2 | 0.1 | | | 0.2 | 0.4 | | 0.5 | | |

Various changes and modifications of the invention can be made and, to the extent that such variations incorporate the spirit of this invention, they are intended to be included within the scope of the appended claims.

What is claimed is:

1. As a new article of manufacture, a transparent glass bead element formed from glass essentially consisting of a composition of the following table wherein the quantities are in percent by weight:

| | |
|---|---|
| $TiO_2$ | 55–75 |
| BaO group | not above 45 |
| ZnO | 0–35 |
| CdO | 0–35 |
| $Bi_2O_3$ | 0–35 |
| PbO | 0–35 |
| Strong glass former group | not above 8 | wherein the BaO group consists of BaO, CaO, SrO and MgO and the total amount of these oxides in the glass is at least 10% by weight, and the strong glass former group consists of $SiO_2$, $Al_2O_3$, $B_2O_3$, $GeO_2$ and $P_2O_5$ and the total amount of these oxides in the glass is at least 0.2% by weight.

2. A glass according to claim 1 containing 5 to 15% CaO and 5 to 30% BaO.

3. A glass according to claim 1 containing about 5 to 30% PbO.

4. A glass according to claim 1 containing about 5 to 30% $Bi_2O_3$.

5. Transparent glass beads which pass through a U.S. Standard 30 mesh sieve formed from glass characterized by having a refractive index of at least 2.1 and essentially consisting of a metal oxide combination meeting the composition requirements of the following table wherein the quantities are in percent by weight:

| | |
|---|---|
| $TiO_2$ | 55–75 |
| BaO group | not above 45 |
| ZnO | 0–35 |
| CdO | 0–35 |
| $Bi_2O_3$ | 0–35 |
| PbO | 0–35 |
| Strong glass former group | not above 8 | wherein the BaO group consists of BaO, CaO, SrO and MgO and the total amount of these oxides in the glass is at least 10% by weight, and the strong glass former group consists of $SiO_2$, $Al_2O_3$, $B_2O_3$, $GeO_2$ and $P_2O_5$ and the total amount of these oxides in the glass is at least 0.2% by weight.

6. Glass beads according to claim 5 which pass through a U.S. Standard 89 mesh sieve.

7. A glass composition according to claim 1 in which 5 to 15% CaO, 5 to 30% BaO and 5 to 30% PbO are at least present.

8. A glass composition according to claim 1 in which not more than 5% of the glass composition is made up of members of the strong glass former group.

References Cited by the Examiner
UNITED STATES PATENTS

| | | | |
|---|---|---|---|
| 2,631,106 | 3/1953 | Mitkewith | 106—52 |
| 2,790,723 | 4/1957 | Stradley et al. | 106—47 |
| 2,992,122 | 7/1961 | Beck et al. | 106—53 |

TOBIAS E. LEVOW, *Primary Examiner.*

H. McCARTHY, *Assistant Examiner.*